United States Patent
Yoshikawa et al.

(10) Patent No.: US 6,583,939 B2
(45) Date of Patent: Jun. 24, 2003

(54) AUXILIARY IMAGING LENS AND IMAGING APPARATUS USING THE SAME

(75) Inventors: Kazuo Yoshikawa, Omiya (JP); Hisao Takemae, Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 241 days.

(21) Appl. No.: 09/725,313

(22) Filed: Nov. 29, 2000

(65) Prior Publication Data

US 2001/0003493 A1 Jun. 14, 2001

(30) Foreign Application Priority Data

Dec. 2, 1999 (JP) .......................................... 11-343793

(51) Int. Cl.[7] .................... G02B 15/02; G02B 13/08; G02B 9/04
(52) U.S. Cl. .................... 359/673; 359/668; 359/793
(58) Field of Search ................... 359/672, 673, 359/668, 793

(56) References Cited

U.S. PATENT DOCUMENTS 4,426,135 A * 1/1984 Hashiya ...................... 359/673
5,555,132 A * 9/1996 Yamada et al. .............. 359/673
5,930,050 A * 7/1999 Dewald ....................... 359/668
6,181,482 B1 * 1/2001 Grafton ....................... 351/673

OTHER PUBLICATIONS

Japanese Patent Office, "Patent Abstracts of Japan", Publication No.: 08094929 A, Date of Publication: Apr. 12, 1996, Application No.: 06252666, Date of Filing: Sep. 22, 1994 (English Abstract).

* cited by examiner

*Primary Examiner*—Scott J. Sugarman
(74) *Attorney, Agent, or Firm*—Snider & Associates; Ronald R. Snider (57) ABSTRACT

An auxiliary imaging lens is attachable to the main part of zoom lens on the object side; and is configured such that, when capturing an image for a screen having an aspect ratio of 4:3, an effective imaging area having such a size that the screen having an aspect ratio of 4:3 in a case without using the auxiliary imaging lens is just held therein can be secured, and a focal length yielding a field of view area substantially on a par with a field of view area obtained when capturing an image for a screen having an aspect ratio of 16:9 can be set.

5 Claims, 10 Drawing Sheets

FIG. 1
EXAMPLE

FIG. 2
COMPARATIVE EXAMPLE 1

FIG. 3 COMPARATIVE EXAMPLE 2

FIG. 4
EXAMPLE

FIG. 5
COMPARATIVE EXAMPLE 1

FIG. 6
COMPARATIVE EXAMPLE 2

FIG. 7A

DIA:11mm

SWITCHABLE CAMERA
(16:9 MODE)
H 68° 49'
V 42° 06'

FIG. 7B

DIA:11mm

SWITCHABLE CAMERA
(4:3 MODE)
H 54° 21'
V 42° 06'

FIG. 7C

DIA:9mm

SWITCHABLE CAMERA
(4:3 MODE, USING RATIO CONVERTER)
H 64° 18'
V 50° 29'

FIG. 7D

IMAGE SIZE   DIA:11mm

CAMERA WITH ASPECT RATIO 4:3
ANGLE OF VIEW   H 64° 18'
(f=7mm)   V 50° 29'

AUXILIARY IMAGING LENS AND IMAGING APPARATUS USING THE SAME

RELATED APPLICATIONS

This application claims the priority of Japanese Patent Application No. 11-343793 filed on Dec. 2, 1999, which is incorporated herein by reference.

BACKGROUND OF THE INVENTION

1. Field of the Invention

The present invention relates to an auxiliary imaging lens which can capture an image while keeping substantially the same field of view area even when taking a picture in a screen having an aspect ratio of 4:3, for example, which is greater in height than a screen having an aspect ratio of 16:9, in a TV camera having an imaging surface with an aspect ratio of 16:9, for example.

2. Description of the Prior Art

While high-definition TV receivers have recently been coming into wider use, actual images having an aspect ratio of 4:3 are still in use as well. In a TV camera using a solid-state imaging device such as CCD, visual signals having a given aspect ratio can be produced when a part of its imaging area is electrically masked. Hence, there has been developed a switchable camera which uses a solid-state imaging device having an imaging area for 16:9 size screen, captures an image by using the whole imaging area when capturing an image for 16:9 size screen, and switches its signal processing such that both side portions in the imaging area of the solid-state imaging device are electrically masked by a predetermined width when capturing an image for 4:3 size screen.

Figure 7A:
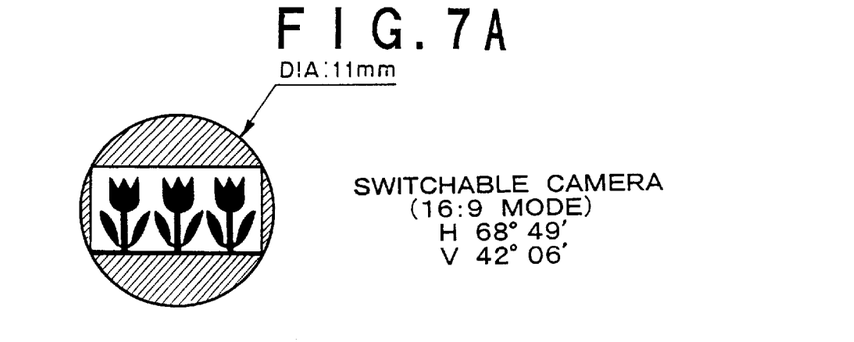
FIGS. 7A to 7D are schematic views for explaining problems of the prior art.
Figure 7B:
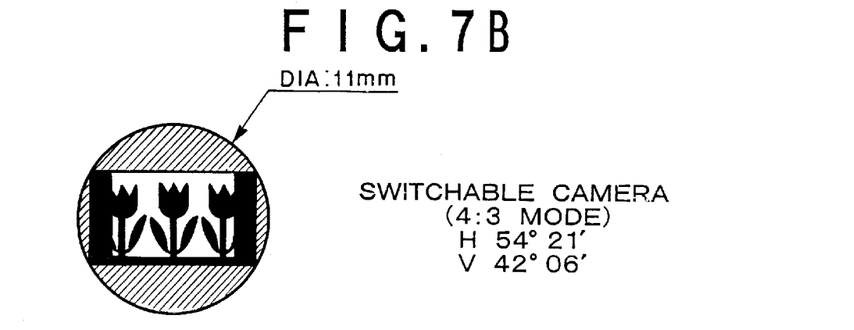
Figure 7C:
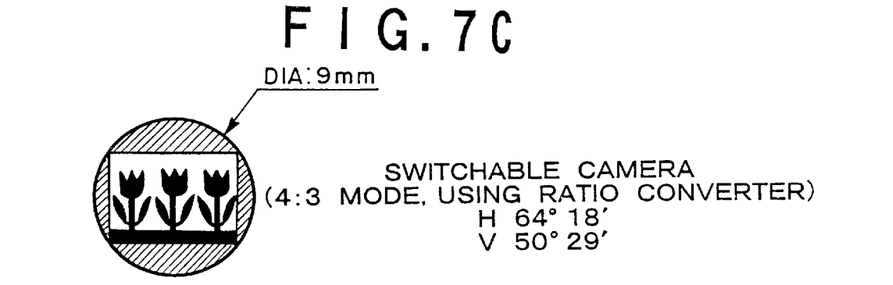
Figure 7D:
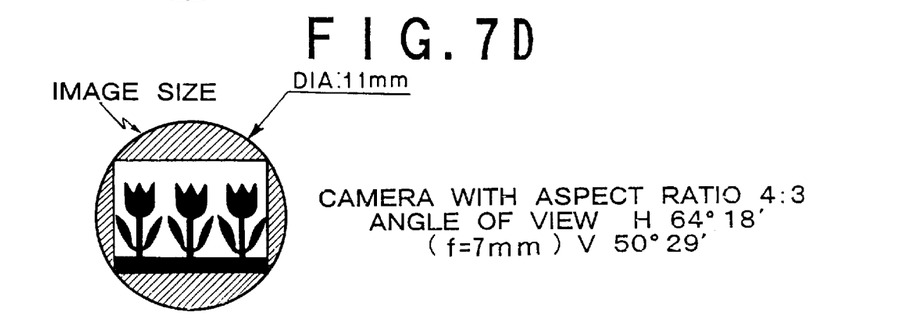

When yielding an image for 16:9 size screen in the switchable camera switching its aspect ratio as mentioned above, a field of view such as the one shown in FIG. 7A is obtained. When an image for 4:3 size screen is to be obtained, however, a part of both right and left sides thereof cannot be held within the field of view as shown in FIG. 7B, whereby the horizontal range is greatly narrowed as compared with the field of view area in a conventional TV camera used for only 4:3 size screen (shown in FIG. 7D). Though the field of view areas in both screens can be adjusted so as to coincide with each other by a zooming operation, such an adjustment is impossible at wide-angle end positions. Also, while the TV camera can be moved away from the object at the time of capturing the image for 4:3 size screen, such an operation may be impossible in a narrow studio and the like.

Therefore, taking account of an extender usually provided in a lens apparatus, the assignee of the present invention has already proposed a configuration in which a lens for correcting the field of view area (ratio converter lens) is attached to the extender (Japanese Unexamined Patent Publication No. 8-94929).

When capturing an image for 16:9 size screen while a lens for correcting the field of view area is attached to an extender as such, the lens is disposed at a position shifted from the optical path. When capturing an image for 4:3 size screen, the extender is operated such that the lens for correcting the field of view area enters the optical path, thus making it possible to change the aspect ratio (see FIG. 7C).

Since the lens for correcting the field of view area is attached to the extender, it cannot easily be removed therefrom, whereby the lens for correcting the field of view area is used for only this TV camera, and it is difficult for the lens to be used in a plurality of TV cameras in common.

The lens for correcting the field of view area may be configured so as to be detachably mounted as an auxiliary lens between the main part of lenses and the camera body, instead of being attached to the extender. When such a lens is used, however, the exit pupil position approaches the imaging surface, thus shortening the eye point distance. As a consequence, upon color decomposition by use of a color-decomposing prism or the like, color shading may occur, thereby deteriorating the color reproducibility at marginal portions. Also, when an auxiliary lens is detachably mounted between the main part of lenses and the camera body, an operation of detaching the main part of lenses from the body in order to remove the auxiliary lens is necessary, whereby a lens having a better operability is desired in particular by cameramen who want to use such a lens in a handy manner in the outdoors.

Further, when capturing an image for 4:3 size screen with the main part of lenses suitable for capturing images for 16:9 size screen, it is necessary that the lens for correcting the field of view area have an afocal power of 0.8. Since so-called wide converter lenses which are commercially available include those having an afocal power of 0.8, they may be attached to the main part of lenses on the object side in place of the above-mentioned auxiliary lens device. As a consequence, the above-mentioned problem in the case of using the auxiliary lens device can be overcome.

However, if a commercially-available wide converter lens having an afocal power of 0.8 is thus used as it is, then a screen which originally necessitates an image circle with a diagonal length of 9 mm is required to secure an image circle with a diagonal length of 11 mm, which is inherent in the solid-state imaging screen, in order for the imaging lens itself to yield a wider angle of view. Therefore, it is necessary for the lens to have a larger outside diameter, which enhances its weight accordingly.

As a result, lenses become larger and heavier on the front side more than necessary. Since the body of TV camera has now been made lighter, the center of gravity will move forward if the front side is heavier, thereby becoming problematic in terms of balance.

As mentioned above, this kind of TV camera needs lightness and compactness since cameramen use it in a handy manner in the outdoors in particular. Also, the camera as a whole requires a favorable balance in order to make its imaging operation better. Therefore, those using a commercially-available wide converter lens mentioned above as it is may involve practically big problems therein.

SUMMARY OF THE INVENTION

For overcoming the problems mentioned above, it is an object of the present invention to provide an auxiliary imaging lens which can correct the field of view such that the color reproducibility can be attained in a favorable state when capturing an image for a normal size screen by using a TV camera for a horizontally longer size screen, can use the lens for correcting the field of view range in a plurality of TV cameras in common, and is excellent in lightness, compactness, and the balance of the camera as a whole.

The present invention provides an auxiliary imaging lens adapted to be attached to a main part of an imaging lens of a TV camera, the TV camera comprising a solid-state imaging device for capturing a horizontally longer size screen and being capable of capturing an image of a normal size screen by masking a part of right and left sides of the solid-state imaging device;

the auxiliary imaging lens being configured such that, when capturing the image for the normal size screen, an effective imaging area having such a size that the normal size screen in a case without using the auxiliary imaging lens is just held therein can be secured, and a focal length yielding a field of view area substantially on a par with a field of view area obtained when capturing the horizontally longer size screen can be set, the auxiliary imaging lens being attachable to the main part of the imaging lens on the object side.

Here, "normal size screen" mentioned above refers to one having a screen size with an aspect ratio which is commonly used in a conventional system, e.g., 4:3 size screen. On the other hand, "horizontally longer size screen" refers to one whose widthwise ratio is greater than the aspect ratio of the above-mentioned normal size screen and is, for example, 16:9 size screen.

The auxiliary imaging lens may comprise, successively from the object side, a biconcave lens and a biconvex lens.

The auxiliary imaging lens may be attached to the main part of the imaging lens by being screwed thereon or by means of a screw.

Also, the present invention provides an imaging apparatus comprising the auxiliary imaging lens.

In general, solid-state imaging devices include those with an aspect ratio of 4:3 conventionally used for cameras, those with an aspect ratio of 16:9 for wide cameras, and those for switchable cameras (in which 16:9 and 4:3 are switched therebetween).

In the case of ⅔-inch cameras, the imaging area has a diagonal length of 11 mm in each of the conventional cameras, wide cameras, and switchable cameras, whereas the width and height of its screen are 8.8 mm×6.6 mm in the conventional cameras, 9.59 mm×5.39 mm in the wide cameras, and 9.59 mm×5.39 mm for 16:9 mode and 7.19 mm×5.39 mm (with a diagonal length of 9 mm) for 4:3 mode in the switchable cameras.

When 4:3 mode is chosen in a switchable camera, only the area having a diameter of 9 mm is used in the imaging area having a diameter of 11 mm for 16:9 mode, so that the angle of view narrows by about 20%, whereby the viewing angle differs from that in the imaging area having a diameter of 11 mm taken in 4:3 mode for the conventional cameras. The resulting image on the screen cannot be considered to satisfy the original specs of the lens.

If an auxiliary imaging lens securing only an area having a diameter of 9 mm, which is the effective area for 4:3 mode, is attached to the front side of the main part of zoom lenses when a switchable lens is used in 4:3 mode, then its taking conditions (such as the field of view area) can be made substantially identical to those in an area having a diameter of 11 mm, which is the effective area of the conventional cameras used only for 4:3 mode, whereby the original specs of lens can be satisfied.

Also, it is smaller, lighter, and easier to handle, and can adapt to lenses incorporating no ratio converters, whereby the selectivity of lenses is widened.

Namely, since the auxiliary imaging lens of the present invention is configured such that a focal length yielding a field of view area substantially on a par with a field of view area obtained when capturing the horizontally longer size screen can be set when capturing an image for a normal size screen, a field of view area equivalent to that in the case of capturing an image for a screen having an aspect ratio of 16:9 can also be secured when capturing an image for a screen having an aspect ratio of 4:3, for example, whereby the part of image to be seen that is located on the right and left sides of the screen would not be cut.

Also, it is configured such that an effective imaging area having such a size that the normal size screen in a case without using the auxiliary imaging lens is just held therein can be secured when capturing the image for the normal size screen. As a consequence, when compared with the case where a commercially-available wide converter lens having an afocal power of 0.8 is attached as it is, the diameter can become about 80%, and the weight can become about the half, so that the lightness and compactness can greatly be advanced, and the TV camera as a whole can attain a better balance.

Further, when attaching/detaching the auxiliary imaging lens upon changing the imaging screen size, the main part of imaging lens can be left attached to the camera body, whereby operator's operations for switching size screens can be improved.

DESCRIPTION OF THE PREFERRED EMBODIMENTS

In the following, an embodiment of the auxiliary imaging lens in accordance with the present invention will be explained with reference to a specific example.

EXAMPLE

Figure 1:
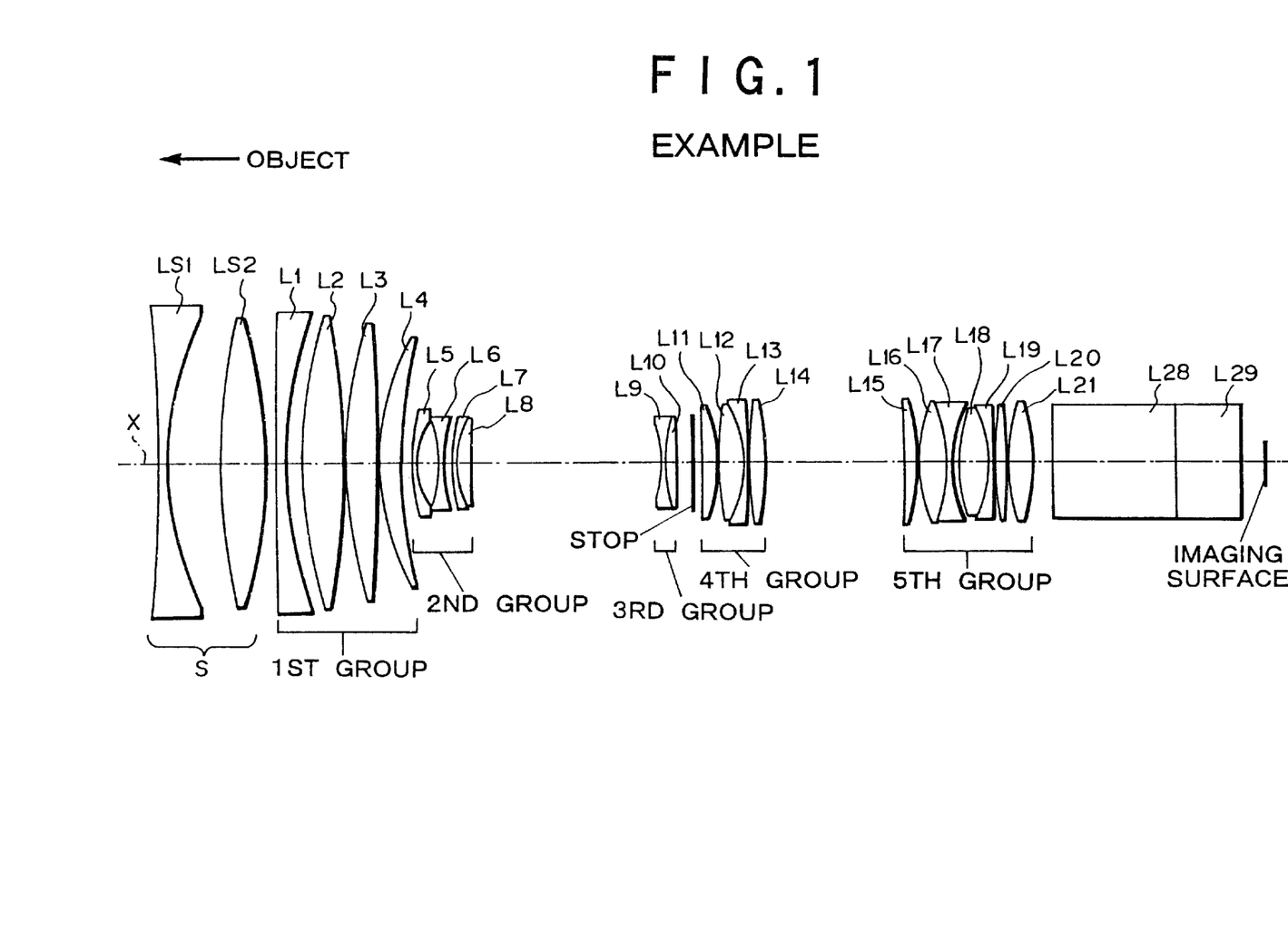
FIG. 1 is a lens diagram showing the auxiliary imaging lens in accordance with an example of the present invention together with the main part of zoom lens.

FIG. 1 shows the auxiliary imaging lens in accordance with an example of the present invention. As shown in FIG. 1, this auxiliary imaging lens S is attached to the main part of imaging lens (hereinafter referred to as main part of zoom lens) on the object side and comprises, successively from the object side, a biconcave lens LS1 having a surface with a weaker curvature directed onto the object side and a biconvex lens LS2 having a surface with a weaker curvature directed onto the object side.

The main part of zoom lens comprises, successively from the object side, a first group L1 to L4 as a focus lens group, a second group L5 to L8 and third group L9 and L10 as zoom lens groups, and a fourth group L11 to L14 and fifth group L15 to L21 as master lens groups. A stop is disposed between the third and fourth groups.

The camera body is provided with color-decomposing prisms L28 and L29, whereas a solid-state imaging device comprising a CCD or the like is disposed as imaging means at an image-forming position on the imaging surface downstream the color-decomposing prisms. The solid-state imaging device forms an optical image of an object obtained by way of the auxiliary imaging lens S, and converts it into an electric signal.

Here, as the solid-state imaging device, one having an effective imaging area whose ratio of width to height is 16:9 is used. If the solid-state imaging device is driven so as to capture image signals by using it as a whole, then image signals to be displayed on a receiver having a horizontally longer screen with an aspect ratio of 16:9 can be obtained. Also, it can be driven in a state where a part of both right and left sides of the imaging area is electrically masked by only a predetermined width when reading out signals from the solid-state imaging device. In such a masked state, image signals to be displayed on a screen having an aspect ratio of 4:3 can be obtained.

The auxiliary imaging lens is configured such that, when capturing an image for a screen having an aspect ratio of 4:3, an effective imaging area having such a size that the screen having an aspect ratio of 4:3 in a case without using the auxiliary imaging lens is just held therein can be secured, and a focal length yielding a field of view area substantially on a par with a field of view area obtained when capturing the horizontally longer size screen can be set. The auxiliary imaging lens is attachable to the main part of the imaging lens on the object side.

Here, for attaining a field of view substantially the same as that in the case of obtaining an image for a screen having an aspect ratio of 16:9 by using the whole imaging area in a state where an image for 4:3 size screen is being captured while the solid-state imaging device is masked, it will be sufficient if the auxiliary imaging lens S is constituted by a lens having an afocal power of 0.8.

Table 1 (follows) shows the radius of curvature R (mm) of each lens surface, axial surface space of each lens (center thickness of each lens and air gap between each pair of neighboring lenses) D (mm), and refractive index $N_e$ and Abbe number $v_e$ of each lens at e-line (together with those of the main part of zoom lens) in this example. Also, the composite focal length f (mm) formed with the main part of zoom lens is shown in the lower part of Table 1. In Table 1 and the following Tables 2 and 3, the numbers referring to each letter successively increase from the object side.

The focal length f of the main part of zoom lens alone at infinity is 9.32 mm (which is the same in Comparative Examples 1 and 2).

Figure 4:
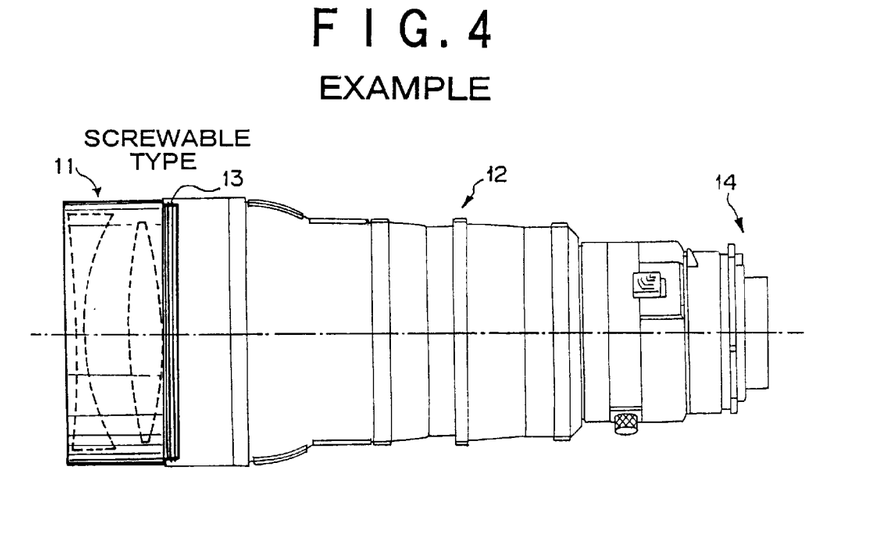
FIG. 4 is a schematic view showing a state where the auxiliary imaging lens in accordance with the example of the present invention is attached to the main part of zoom lens.

Also, the auxiliary imaging lens of this example is accommodated in a ring-shaped mount 11 as shown in FIG. 4, whereby it can be attached to the main part of zoom lens when the mount 11 is screwed onto an object-side threaded portion 13 of a lens barrel 12 for the main part of zoom lens.

A camera attachment 14 is disposed on the camera body side of the lens barrel 12 for the main part of zoom lens.

COMPARATIVE EXAMPLE 1

Figure 2:
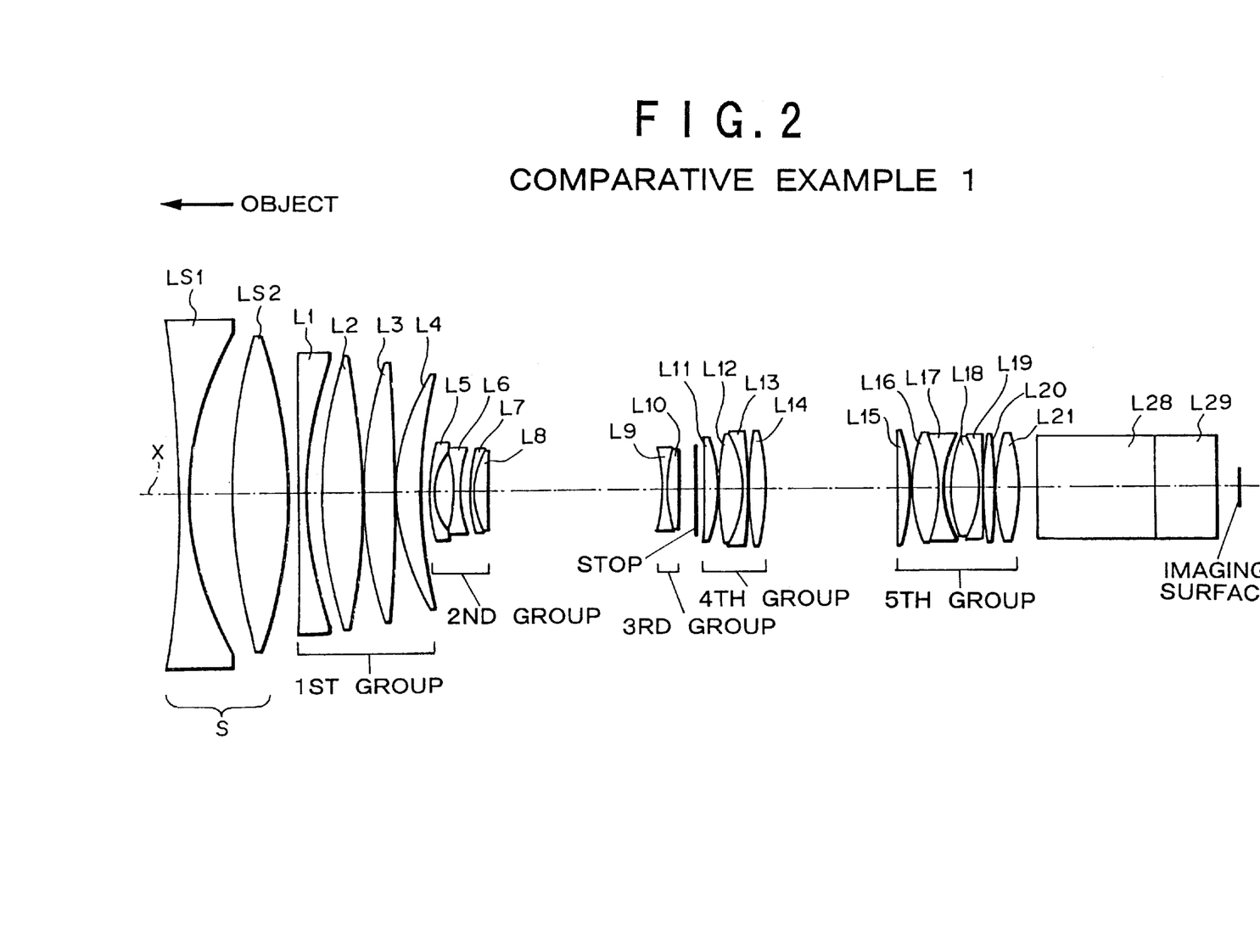
FIG. 2 is a lens diagram showing the wide converter lens in accordance with Comparative Example 1 together with the main part of zoom lens.

The wide converter lens S in accordance with this comparative example is configured so as to form an image circle having a diameter of 11 mm on a solid-state imaging device. As shown in FIG. 2, it comprises, successively from the object side, a biconcave lens LS1 having a surface with a weaker curvature directed onto the object side and a biconvex lens LS2 having a surface with a weaker curvature directed onto the object side, whereby its configuration is substantially the same as that in the above-mentioned example in this regard but differs therefrom in that the size of each lens is considerably larger than its corresponding lens in the above-mentioned example. Since the lens size is greater, it is opposed to the demands for lightness and compactness.

Table 2 shows the radius of curvature R (mm) of each lens surface, axial surface space of each lens (center thickness of each lens and air gap between each pair of neighboring lenses) D (mm), and refractive index $N_e$ and Abbe number $v_e$ of each lens at e-line in this comparative example. Also, the composite focal length f (mm) formed with the main part of zoom lens is shown in the lower part of Table 2.

Figure 5:
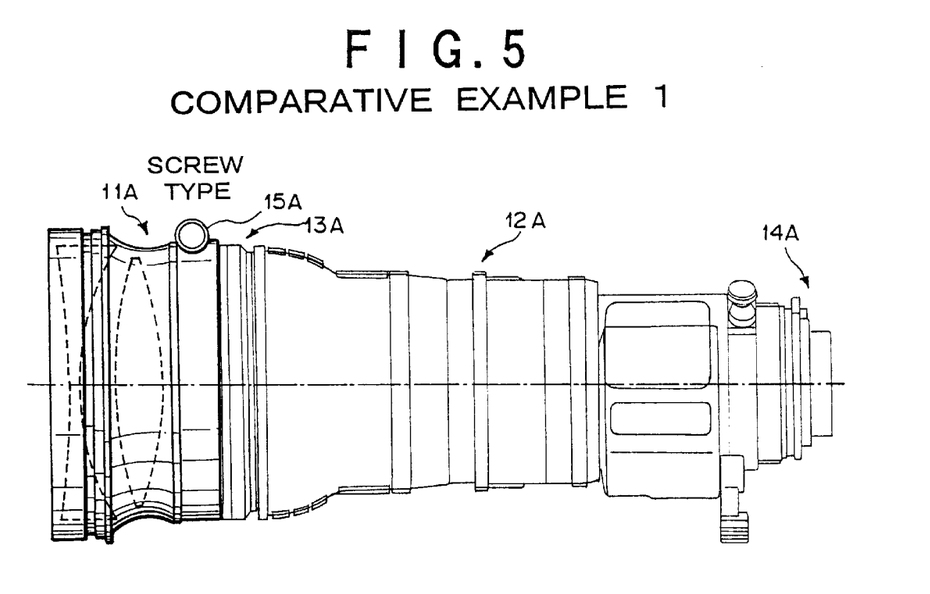
FIG. 5 is a schematic view showing a state where the wide converter lens in accordance with Comparative Example 1 is attached to the main part of zoom lens.

The wide converter lens S of this comparative example is accommodated in a ring-shaped mount 11A as shown in FIG. 5, whereby it can be attached to the main part of zoom lens if the mount 11A is fitted to an object-side end engagement portion 13A of a lens barrel 12A for the main part of zoom lens and then is fastened to the object-side end engagement portion 13A by means of a screw 15A. Since the wide converter lens S is heavy in this comparative example, it is hard to be held by a simple screwing mechanism as in the above-mentioned example.

A camera attachment 14A is disposed on the camera body side of the lens barrel 12A for the main part of zoom lens.

COMPARATIVE EXAMPLE 2

Figure 3:
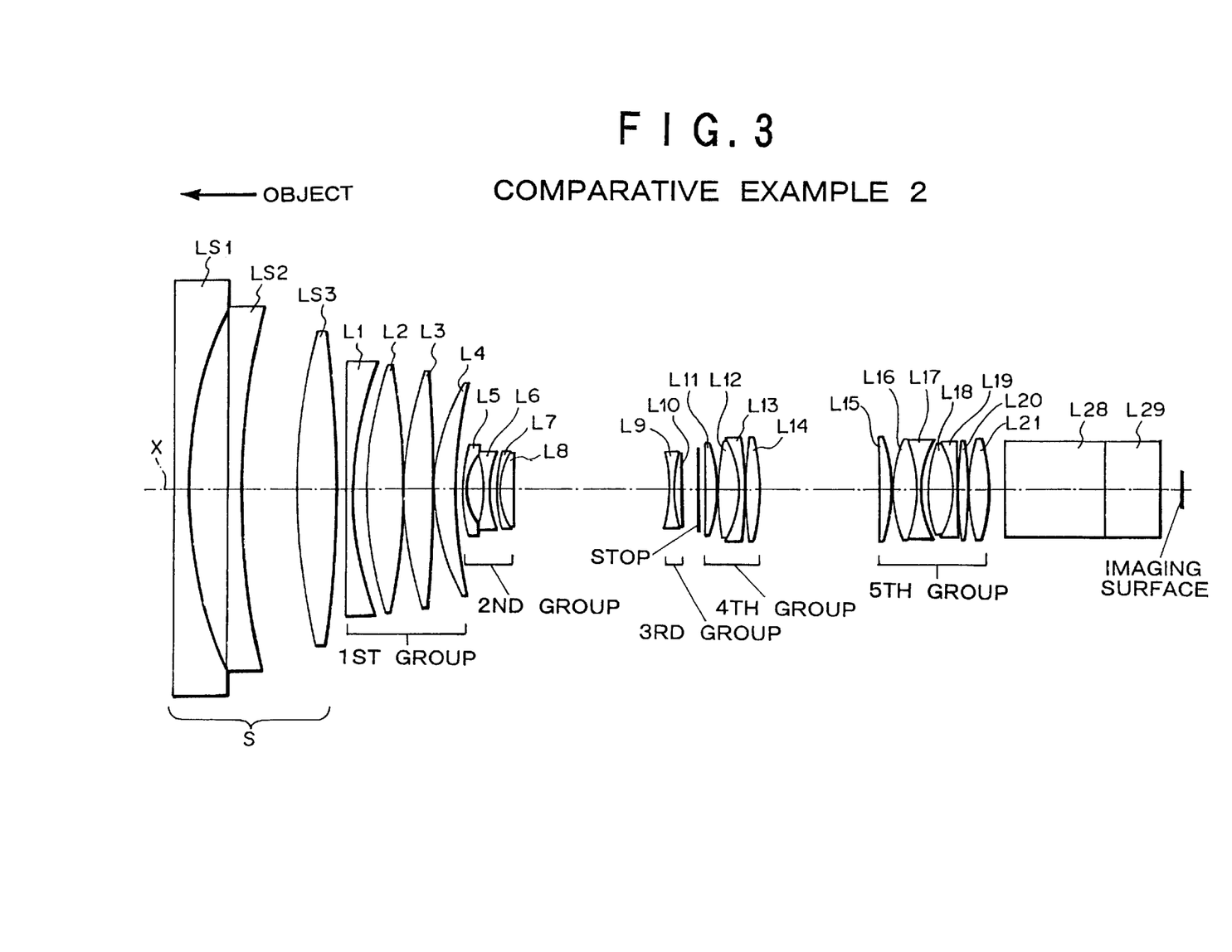
FIG. 3 is a lens diagram showing the wide converter lens in accordance with Comparative Example 2 together with the main part of zoom lens.

The wide converter lens S in accordance with this comparative example is also configured so as to form an image circle having a diameter of 11 mm on a solid-state imaging device. As shown in FIG. 3, it comprises, successively from the object side, plano-concave lenses LS1 and LS2, each having a planar surface directed onto the object side, and a biconvex lens LS3 having a surface with a stronger curvature directed onto the object side, while each lens is considerably larger than its corresponding lens in the above-mentioned example. Since the lens size is greater, it is opposed to the demands for lightness and compactness.

Table 3 shows the radius of curvature R (mm) of each lens surface, axial surface space of each lens (center thickness of each lens and air gap between each pair of neighboring lenses) D (mm), and refractive index $N_e$ and Abbe number $v_e$ of each lens at e-line in this comparative example. Also, the composite focal length f (mm) formed with the main part of zoom lens is shown in the lower part of Table 3.

Figure 6:
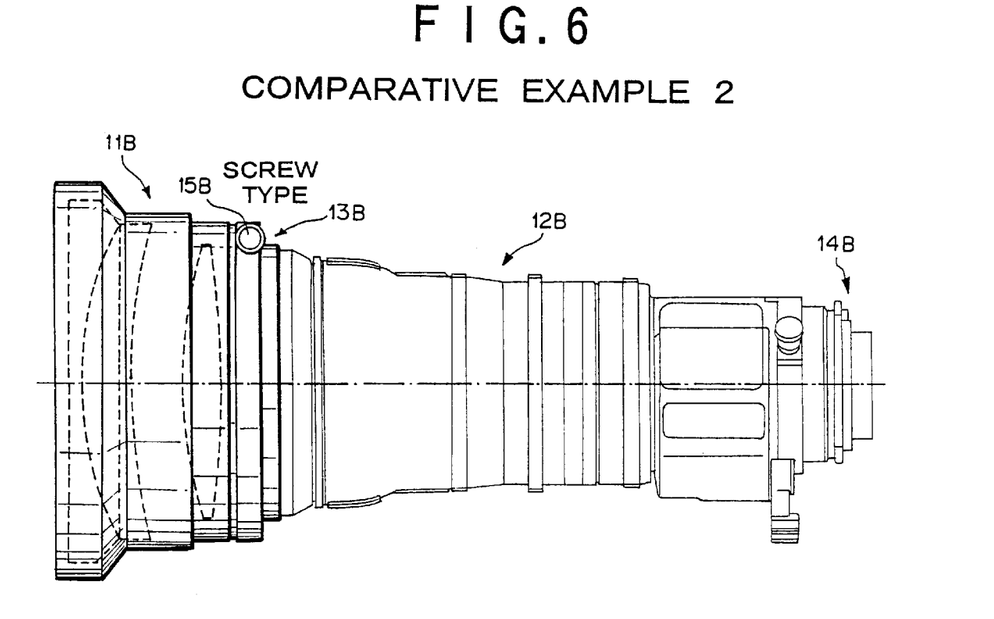
FIG. 6 is a schematic view showing a state where the wide converter lens in accordance with Comparative Example 2 is attached to the main part of zoom lens.

The wide converter lens S of this comparative example is accommodated in a ring-shaped mount 11B as shown in FIG. 6, whereby it can be attached to the main part of zoom lens if the mount 11B is fitted to an object-side end engagement portion 13B of a lens barrel 12B for the main part of zoom lens and then is fastened to the object-side end engagement portion 13B by means of a screw 15B. Since the wide converter lens S is heavy in this comparative example as well, it is hard to be held by a simple screwing mechanism as in the above-mentioned example.

A camera attachment 14B is disposed on the camera body side of the lens barrel 12B for the main part of zoom lens.

Here, FIGS. 8 to 11 schematically show the cases where an image is captured by an imaging camera for only a screen having an aspect ratio of 4:3 (Prior Art 1), where an image for a screen with an aspect ratio of 4:3 is captured by a switchable camera having an imaging device for a screen with an aspect ratio of 16:9 and a ratio converter lens mounted in an extender portion (Prior Art 2), where an image for a screen with an aspect ratio of 4:3 is captured by a switchable camera having an imaging device for a screen having an aspect ratio of 16:9 and a wide converter lens with an afocal power of 0.8 mounted on the object side (Prior Art 3), and where an image for a screen with an aspect ratio of 4:3 is captured by a switchable camera having an imaging device for a screen with an aspect ratio of 16:9 and an auxiliary imaging lens (that of the example), respectively. In each case, the half angle of view ($\omega1$, $\omega2$, $\omega11$, $\omega21$) and the maximum height of incident beam (Y1, Y2, Y11, Y21) in the lens closest to the object were verified. On the right side of each of FIGS. 8 to 11, a schematic view of image circle on the imaging device (in which D1 is 16:9 mode, whereas D2 is 4:3 mode) is shown. Also, the distance between the lens closest to the object and the entrance pupil position is shown as S1, S2, S11, and S21, whereas the total focal length of the lens is shown as f1, f2, f11, and f12.

Figure 8:
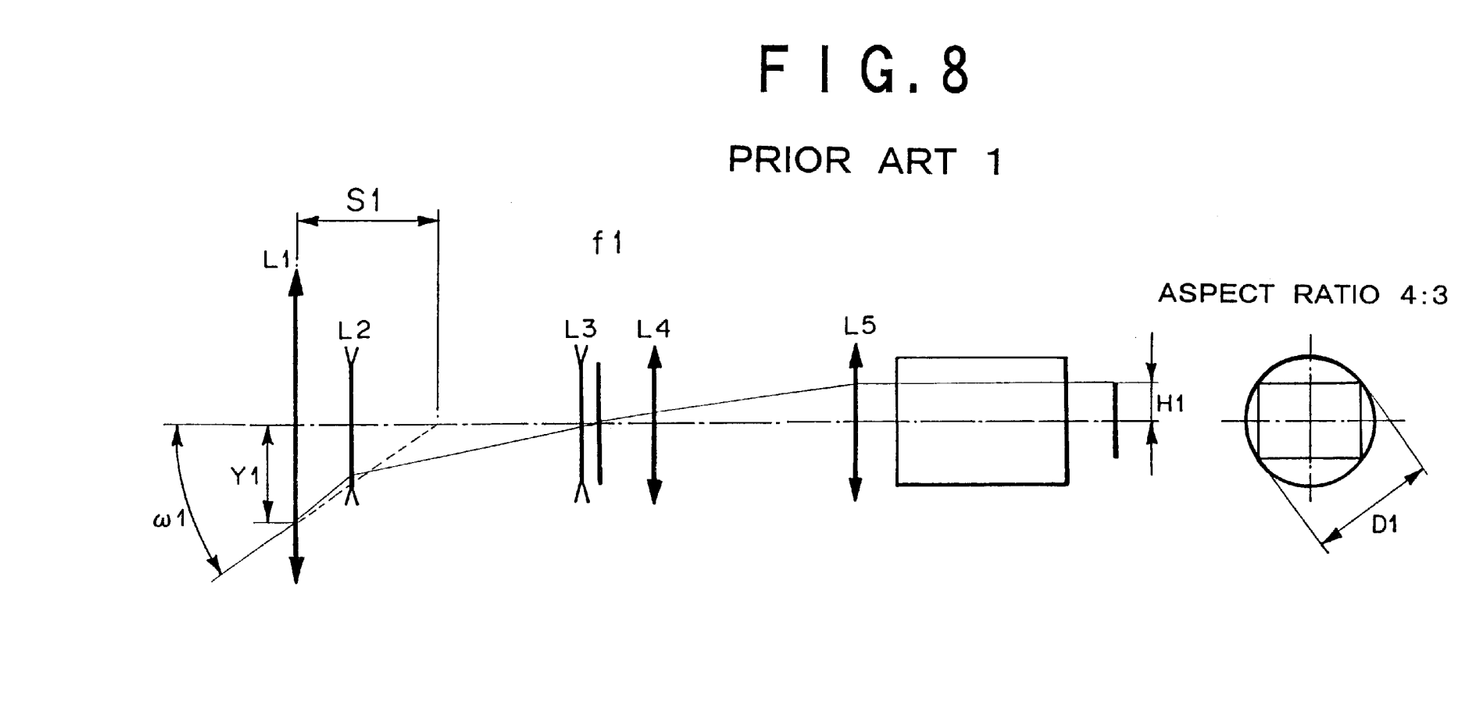
FIG. 8 is a schematic view for verifying the half angle of view and incident beam height of Prior Art 1.

As shown in FIG. 8, the half angle of view $\omega1$ and maximum height Y1 of incident beam according to the above-mentioned Prior Art 1 is indicated by the following set of expressions (1). In the following expressions, Lx refers to the focal length of the single lens referred to with this number.

For Prior Art 1 (4:3 screen):

$$\omega = \tan^{-1}\frac{H_1}{f_1} \quad (1)$$

$$T_1 = S_1 \cdot \tan\omega_1$$

Figure 9:
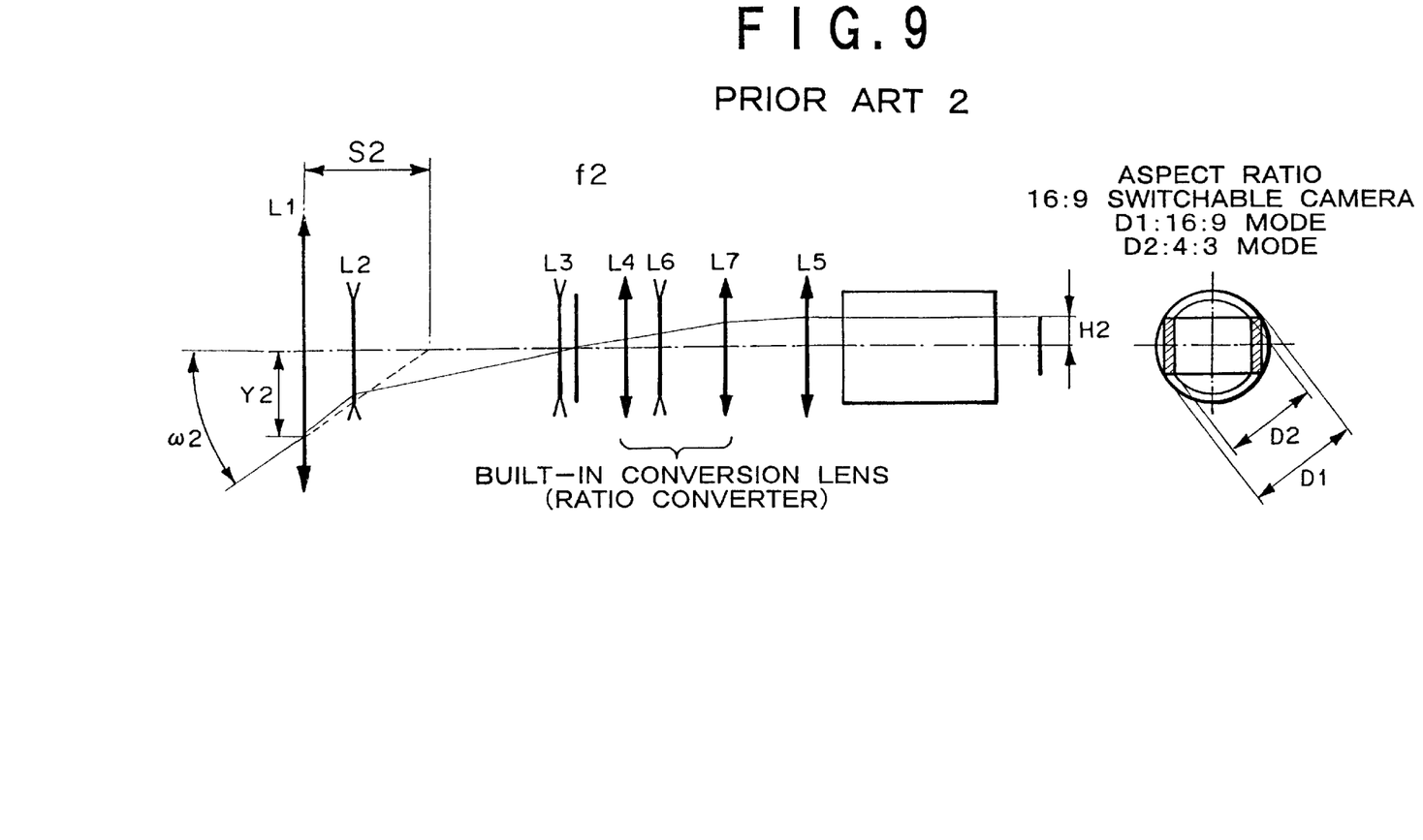
FIG. 9 is a schematic view for verifying the half angle of view and incident beam height of Prior Art 2.

As shown in FIG. 9, the half angle of view $\omega2$ and maximum height Y2 of incident beam according to the above-mentioned Prior Art 2 is indicated by the following set of expressions (2).

For Prior Art 2 (capturing 4:3 screen in 16:9 screen):

$$f_2 = f_1 \cdot M \quad (2)$$

$$M = \left|\frac{L_6}{L_7}\right| = \left|\frac{D_2}{D_1}\right|$$

$$H_2 = H_1 \cdot M$$

$$\omega_2 = \tan^{-1}\frac{H_1}{f_{11}} = \omega_1$$

$$Y_1 = S_2 \cdot \tan\omega_2 = Y_1$$

$$S_2 = S_1$$

Figure 10:
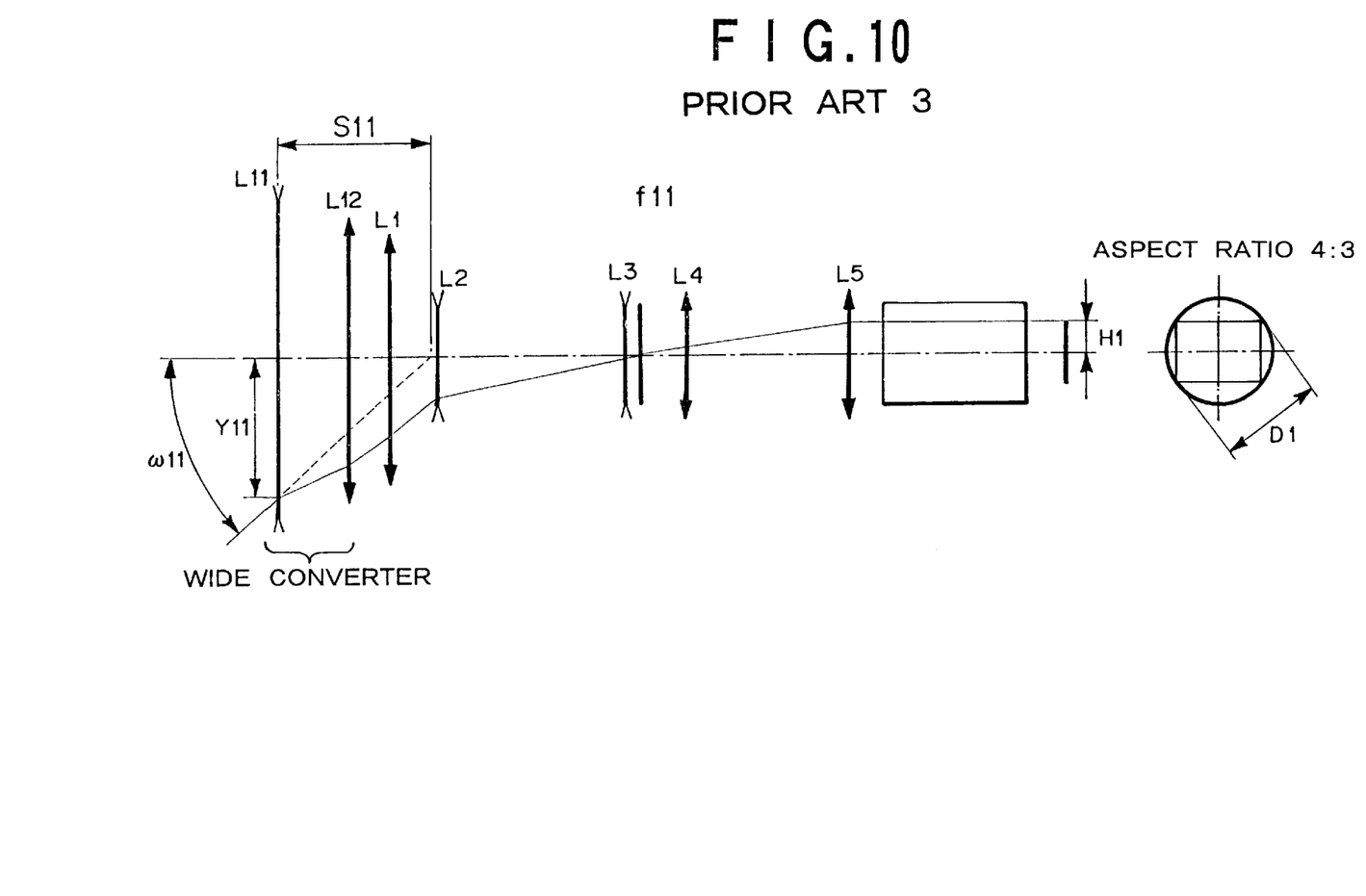
FIG. 10 is a schematic view for verifying the half angle of view and incident beam height of Prior Art 3.

As shown in FIG. 10, the half angle of view $\omega11$ and maximum height Y11 of incident beam according to the above-mentioned Prior Art 3 is indicated by the following set of expressions (3).

For Prior Art 3 (with a wide converter):

$$\text{converter power } M_{11} = \left|\frac{L_{11}}{L_{12}}\right| \quad (3)$$

$$f_{11} = f_1 \cdot M_{11}$$

$$\omega_{11} = \tan^{-1}\frac{H_1}{f_{11}}$$

-continued $$\omega_{11} > \omega_1$$

$$Y_{11} = S_{11} \cdot \tan\omega_{11}$$

Figure 11:
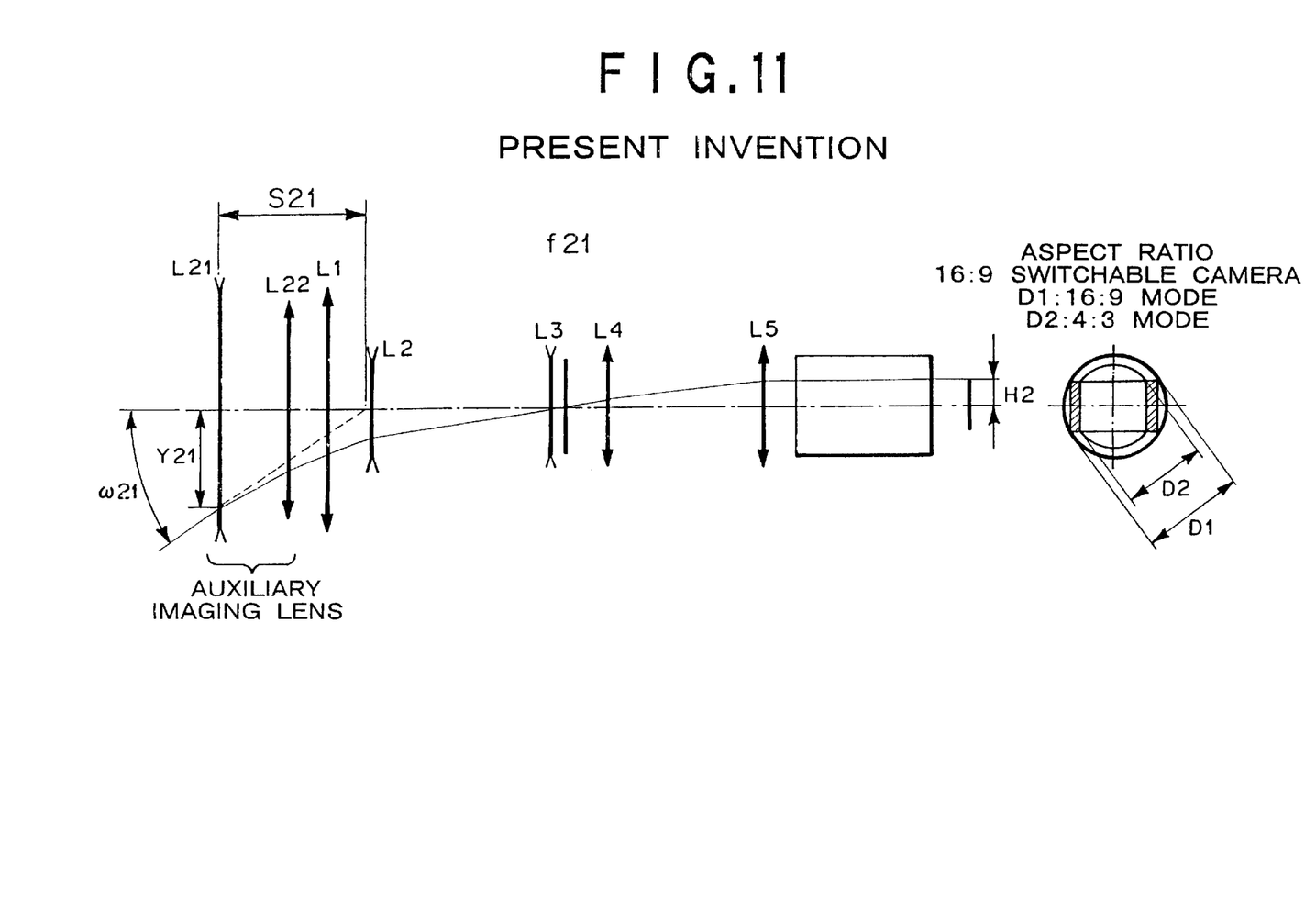
FIG. 11 is a schematic view for verifying the half angle of view and incident beam height of the auxiliary imaging lens of the present invention.

As shown in FIG. 11, the half angle of view $\omega21$ and maximum height Y21 of incident beam according to the present invention is indicated by the following set of expressions (4).

For the present invention:

$$\text{converter power } M_{11} = \left|\frac{L_{21}}{L_{22}}\right| = \left|\frac{L_{11}}{L_{12}}\right| \quad (4)$$

$$f_{21} = f_1 \cdot M_{21}$$

$$\omega_{21} = \tan^{-1}\frac{H_2}{f_{21}}$$

$$\omega_{21} > \omega_2$$

$$Y_{21} = S_{21} \cdot \tan\omega_{21}$$

$$S_{21} = S_{11}$$

$$Y_{21} < Y_{11}$$

Thus, the outside diameter of lens can be reduced since only the imaging area for D2 is covered.

The above-mentioned verification indicates that, by securing the minimally required angle of view, the one using the auxiliary imaging lens of the present invention can make the lens size compact while achieving necessary specs.

As explained in the foregoing, the auxiliary imaging lens of the present invention is configured such that an effective imaging area having such a size that the normal size screen in a case without using the auxiliary imaging lens is just held therein can be secured when capturing an image for the normal size screen. As a consequence, when compared with the case where a commercially-available so-called wide converter lens is attached as it is, the diameter size and weight can greatly be reduced, so that the lightness and compactness can greatly be advanced, and the TV camera as a whole can attain a better balance.

Further, the auxiliary imaging lens of the present invention can correct the field of view area such that the color reproducibility can be attained in a favorable state when capturing a image for the normal size screen by using a TV camera for a horizontally longer size screen, and can use the lens for correcting the field of view range in a plurality of TV cameras in common.

TABLE 1

| | Example | | | |
|---|---|---|---|---|
| Surface | R | D | $N_e$ | $v_e$ |
| 1 | −500.0 | 2.20 | 1.79013 | 43.9 |
| 2 | 79.34 | 13.48 | | |
| 3 | 147.06 | 11.05 | 1.66152 | 50.6 |
| 4 | −126.2 | 2.5 | | |
| 5 | 4000.0 | 2.20 | 1.81263 | 25.3 |
| 6 | 101.01 | 4.31 | | |
| 7 | 112.99 | 10.63 | 1.43496 | 95.1 |
| 8 | −180.92 | 0.11 | | |
| 9 | 107.53 | 8.38 | 1.62032 | 63.0 |
| 10 | −399.42 | 0.11 | | |
| 11 | 57.70 | 6.12 | 1.73234 | 54.5 |
| 12 | 130.52 | 0.80 | | |

TABLE 1-continued

Example

| Surface | R | D | $N_e$ | $v_e$ |
|---|---|---|---|---|
| 13 | 48.66 | 0.71 | 1.80399 | 42.0 |
| 14 | 16.45 | 5.95 | | |
| 15 | −27.93 | 0.71 | 1.77620 | 49.4 |
| 16 | 31.75 | 2.91 | | |
| 17 | 45.66 | 0.71 | 1.69401 | 54.5 |
| 18 | 22.56 | 3.65 | 1.85503 | 23.6 |
| 19 | 494.88 | 47.36 | | |
| 20 | −26.38 | 0.71 | 1.72692 | 51.0 |
| 21 | 36.65 | 2.60 | 1.81262 | 25.2 |
| 22 | 1818.20 | 5.04 | | |
| 23 | (stop) | 1.51 | | |
| 24 | −2704.47 | 3.90 | 1.58481 | 40.6 |
| 25 | −38.74 | 0.11 | | |
| 26 | 62.32 | 6.70 | 1.48914 | 70.2 |
| 27 | −27.74 | 1.10 | 1.80932 | 39.4 |
| 28 | −155.83 | 0.11 | | |
| 29 | 126.85 | 4.00 | 1.48914 | 70.2 |
| 30 | −71.90 | 34.83 | | |
| 31 | −1013.77 | 3.95 | 1.49394 | 81.7 |
| 32 | −44.83 | 0.11 | | |
| 33 | 34.67 | 7.25 | 1.55098 | 45.6 |
| 34 | −39.71 | 1.10 | 1.83961 | 42.8 |
| 35 | 26.26 | 2.00 | | |
| 36 | 37.69 | 7.49 | 1.51825 | 63.8 |
| 37 | −26.67 | 1.05 | 1.81080 | 40.5 |
| 38 | 520.28 | 0.11 | | |
| 39 | 94.77 | 3.23 | 1.51825 | 63.8 |
| 40 | −177.63 | 0.11 | | |
| 41 | 45.59 | 6.22 | 1.51825 | 63.8 |
| 42 | −44.27 | 5.00 | | |
| 43 | ∞ | 30.00 | 1.60718 | 37.8 |
| 44 | ∞ | 16.20 | 1.51825 | 63.8 |
| 45 | ∞ | | | |
| focal length | (at inf.) 7.73 | | | |

TABLE 2

Comparative Example 1

| Surface | R | D | $N_e$ | $v_e$ |
|---|---|---|---|---|
| 1 | −333.33 | 2.5 | 1.79013 | 43.9 |
| 2 | 83.19 | 11.34 | | |
| 3 | 135.14 | 15.0 | 1.66152 | 50.6 |
| 4 | −126.95 | 2.5 | | |
| 5 | fifth and later surfaces are identical to those in Example | | | |
| focal length | (at inf.) 7.73 | | | |

TABLE 3

Comparative Example 2

| Surface | R | D | $N_e$ | $v_e$ |
|---|---|---|---|---|
| 1 | ∞ | 4.2 | 1.57628 | 42.4 |
| 2 | 127.27 | 11.78 | | |
| 3 | ∞ | 3.75 | 1.57628 | 42.4 |
| 4 | 229.45 | 16.17 | | |
| 5 | 166.67 | 12.43 | 1.67340 | 46.9 |
| 6 | −312.55 | 2.5 | | |
| 7 | seventh and later surfaces are identical to those in Example | | | |
| focal length | (at inf.) 7.65 | | | |

What is claimed is:

1. An auxiliary imaging lens adapted to be attached to a main part of an imaging lens of a TV camera, said TV camera comprising a solid-state imaging device for capturing a horizontally longer size screen and being capable of capturing an image of a normal size screen by masking a part of right and left sides of said solid-state imaging device; and wherein when said auxiliary imaging lens is attached to the main part of the imaging lens on an object side; a whole image for the normal size screen is substantially secured, a field of view area is substantially on par with a field of view area for the horizontally longer size screen, and focal length is determined in accordance with aspect ratios of the horizontally longer size screen and the normal size screen.

2. An auxiliary imaging lens according to claim 1, wherein said auxiliary imaging lens comprises, successively from the object side, a biconcave lens and a biconvex lens.

3. An auxiliary imaging lens according to claim 1, wherein said horizontally longer size screen has an aspect ratio of 16:9; and wherein said normal size screen has an aspect ratio of 4:3.

4. An auxiliary imaging lens according to claim 1, wherein said auxiliary imaging lens is attached to said main part of imaging lens by being screwed thereon or by means of a screw.

5. An imaging apparatus comprising the auxiliary imaging lens according to claim 1.

* * * * *